US012780097B2

(12) United States Patent
Faurie et al.

(10) Patent No.: US 12,780,097 B2
(45) Date of Patent: Nov. 3, 2026

(54) VISUALIZATION SYSTEM FOR MOTOR VEHICLE, ASSOCIATED COMPUTER METHOD AND PROGRAM

(71) Applicant: Faurecia Clarion Electronics Europe, Paris (FR)

(72) Inventors: Jean-Baptiste Faurie, Paris (FR); Eric Aubepart, Paris (FR)

(73) Assignee: Faurecia Clarion Electronics Europe, Paris (FR)

( * ) Notice: Subject to any disclaimer, the term of this patent is extended or adjusted under 35 U.S.C. 154(b) by 46 days.

(21) Appl. No.: 18/397,573

(22) Filed: Dec. 27, 2023

(65) Prior Publication Data

US 2024/0208418 A1 Jun. 27, 2024

(30) Foreign Application Priority Data

Dec. 27, 2022 (FR) ..................................... 22 14535

(51) Int. Cl.
*B60R 1/26* (2022.01)
*B60R 1/29* (2022.01)
(Continued)

(52) U.S. Cl.
CPC ................. *B60R 1/26* (2022.01); *B60R 1/29* (2022.01); *G06V 20/58* (2022.01); *G06V 20/597* (2022.01);
(Continued)

(58) Field of Classification Search
CPC ......... B60R 1/26; B60R 1/29; B60R 2300/40; B60R 2300/8006; B60R 2300/8093; G06V 20/58; G06V 20/597
See application file for complete search history.

(56) References Cited

U.S. PATENT DOCUMENTS 8,115,811 B2 * 2/2012 Hiramaki .................. B60R 1/28 348/148
11,718,226 B2 * 8/2023 Nagatani ............... B60W 50/14 340/439
(Continued)

FOREIGN PATENT DOCUMENTS

CN 114067377 A * 2/2022
DE 102014226860 A1 * 6/2016 ............. B60K 35/29
(Continued)

OTHER PUBLICATIONS

French Search Report corresponding to application FR 2214535, dated Jun. 16, 2023, 2 pages.

*Primary Examiner* — Chico A Foxx
(74) *Attorney, Agent, or Firm* — Reising Ethington P.C.

(57) ABSTRACT

A system and a visualization method for a motor vehicle. The method uses steps of controlling a brightness level of at least one display surface, including: controlling basic illumination on the display surface with a basic brightness level, and controlling an increase of the brightness level on the image display area obtained, from the basic brightness level to at least one enhanced brightness level, when one of the following two conditions is validated: detecting a direction of the gaze of the driver oriented toward the obtained image display area, or detecting at least one obstacle corresponding to a danger level greater than a first predetermined danger threshold, the direction of gaze of the detected driver not being oriented toward the display area.

11 Claims, 2 Drawing Sheets

(51) Int. Cl.
*G06V 20/58* (2022.01)
*G06V 20/59* (2022.01)

(52) U.S. Cl.
CPC ... *B60R 2300/40* (2013.01); *B60R 2300/8006* (2013.01); *B60R 2300/8093* (2013.01)

(56) References Cited

U.S. PATENT DOCUMENTS

| | | | | |
|---|---|---|---|---|
| 2006/0274147 | A1* | 12/2006 | Chinomi | G06T 3/4038 348/E7.086 |
| 2011/0012746 | A1* | 1/2011 | Fish, Jr. | H05B 47/115 340/815.45 |
| 2012/0320212 | A1* | 12/2012 | Aimura | G01C 21/3602 348/148 |
| 2013/0241747 | A1* | 9/2013 | Hatakeyama | G08G 1/166 340/901 |
| 2015/0355805 | A1* | 12/2015 | Chandler | G06F 3/04817 |
| 2016/0110618 | A1* | 4/2016 | Oba | G06V 20/597 348/148 |
| 2016/0170487 | A1 | 6/2016 | Saisho | |
| 2016/0179195 | A1 | 6/2016 | Motz et al. | |
| 2016/0257252 | A1* | 9/2016 | Zaitsev | G06V 20/56 |
| 2016/0342205 | A1* | 11/2016 | Shigeta | G06V 10/147 |
| 2018/0272948 | A1* | 9/2018 | Kumon | G06T 19/006 |
| 2018/0297470 | A1* | 10/2018 | Kim | B60Q 1/00 |
| 2018/0297520 | A1* | 10/2018 | Morimura | B60Q 9/008 |
| 2018/0312111 | A1* | 11/2018 | Bongwald | B60R 1/26 |
| 2021/0048884 | A1* | 2/2021 | Beineke | G06F 3/013 |
| 2021/0323484 | A1* | 10/2021 | Jeong | B60R 11/0235 |
| 2022/0111794 | A1* | 4/2022 | Taniguchi | B60R 1/26 |
| 2022/0189301 | A1* | 6/2022 | Nakazawa | G08G 1/09626 |
| 2023/0103678 | A1* | 4/2023 | Yuda | H04N 23/951 348/148 |
| 2023/0286437 | A1* | 9/2023 | Stent | B60W 50/14 |
| 2023/0356653 | A1* | 11/2023 | Nagata | G06F 3/013 |
| 2024/0029453 | A1* | 1/2024 | Sano | G06V 20/597 |

FOREIGN PATENT DOCUMENTS

| | | | | | |
|---|---|---|---|---|---|
| DE | 102016007493 | A1 | * | 2/2017 | B60K 35/22 |
| EP | 2233356 | A1 | * | 9/2010 | G08G 1/166 |
| EP | 3031655 | A1 | * | 6/2016 | B60K 35/231 |
| EP | 3156278 | A1 | * | 4/2017 | B60K 35/00 |
| JP | 2025064455 | A | * | 4/2025 | B60W 30/0956 |

* cited by examiner

VISUALIZATION SYSTEM FOR MOTOR VEHICLE, ASSOCIATED COMPUTER METHOD AND PROGRAM

TECHNICAL FIELD

The present invention relates to a visualization system for a motor vehicle, of the type comprising at least one display surface of images obtained by at least one sensor positioned toward the outside of the vehicle, said display surface being illuminated by at least one associated illumination unit.

The invention also relates to an associated visualization method and an associated computer program.

BACKGROUND

The invention is in the field of visualization systems for vehicles equipped with sensors or wireless communication means making it possible to receive data from sensors of a remote system, in particular image sensors, making it possible to acquire images of the external environment of the vehicle.

Indeed, in traditional motor vehicles, knowledge of the external environment of the vehicle that is not situated in the forward field of view of the driver, through the windshield, is provided by the presence of mirrors located in various locations, for example central, right and left, oriented toward the rear of the vehicle, thus allowing the driver to partially view the outside spaces behind and to the sides of the vehicle. Of course, this is necessary to ensure avoidance of obstacles and dangers, to preserve the safety of vehicle occupants, other road users, pedestrians, etc.

In modern vehicles, several sensors, for example cameras, are positioned at various locations, and images captured in real time can be displayed on display surfaces, for example located in the passenger compartment of the vehicle. This makes it possible to considerably increase the field of visualization, and also to apply various processings, such as image processing for example, to better detect the presence of dangers and obstacles, which makes it possible to increase safety, for example by anticipating the presence of dangers.

However, the various means implemented for this purpose, and in particular the extended display surfaces, also significantly increase the consumption of electrical energy, which is not desirable.

There is a need to limit the consumption of electrical energy in motor vehicles, while ensuring as much as possible protection against any collision danger so as to preserve road safety.

SUMMARY

To this end, according to one aspect, the invention proposes a visualization system for a motor vehicle operated by a driver present in the motor vehicle, comprising a display surface comprising a display area of images obtained by at least one image sensor configured to capture images from the outside of the vehicle, said display surface being illuminated by at least one associated illumination unit, a module for detecting obstacle(s) in said obtained images, configured to detect a presence of obstacles by image processing and to calculate an associated danger level, a module for detecting a direction of the gaze of the driver of the motor vehicle, and an electronic device comprising a computing processor. The computing processor implements a module for controlling said at least one illumination unit configured for:

controlling a basic illumination on said display surface with a basic brightness level;

controlling an increase in the brightness level in said obtained image display area, from the basic brightness level to at least one enhanced brightness level, when one of the following two conditions is validated:

the module for detecting the direction of the gaze of the driver detects a direction oriented toward said obtained image display area, or the obstacle detection module(s) detects at least one obstacle corresponding to a calculated danger level that exceeds a first predetermined danger threshold, and the direction of gaze of the detected driver is not oriented toward said display area.

Advantageously, the proposed system makes it possible to reconcile the energy saving and safety objectives, thanks to an increase in the illumination to obtain an enhanced brightness level only when this is useful for the driver. In addition, advantageously, the increase in the brightness level in the event of detection of a danger makes it possible to attract the driver's attention, the increase in the brightness level acting as a visual stimulus for the driver.

The visualization system according to the invention may also have one or more of the features hereunder, taken independently or according to all technically conceivable combinations.

The basic brightness level is increased in a first duration interval between one millisecond and twenty milliseconds.

The control module is further configured, when the danger level passes below said first predetermined danger threshold and the direction of gaze detected by the module for detecting a driver's direction of gaze is not oriented toward said obtained image display area, to gradually decrease the brightness level toward the basic brightness level, during a second duration time interval.

The system is configured to implement an alert generating module when the detected danger level is greater than a second predetermined danger threshold, greater than the first predetermined danger threshold and the direction of gaze detected by the detection module of a driver's direction of gaze is not oriented toward said obtained image display area.

The alert generating module controls an issuance of stimuli configured to alert the driver as a function of the calculated danger level.

In the case where condition b) is validated, the control module is configured to control a level of enhanced brightness selected according to the calculated danger level, the brightness level increasing with the calculated danger level.

In the case where condition b) is validated, the control module is configured to control a maximum brightness level of illumination.

According to another aspect, the invention relates to a visualization method for a motor vehicle operated by a driver present in the motor vehicle, in order to view images obtained by at least one image sensor configured to capture images from the outside of the vehicle, and displayed on an area of a display surface, said display surface being illuminated by at least one associated illumination unit, implemented by an on-board programmable electronic device, configured to continuously receive a direction of gaze of the vehicle driver, to detect a presence of obstacles by image processing and to calculate an associated level of danger. The method comprises steps of controlling a brightness level of said at least one display surface, comprising:

controlling basic illumination on said display surface with a basic brightness level, and controlling the increase in the brightness level on said obtained image display area, from the basic brightness level to at least one enhanced brightness level, when one of the following two conditions is validated:

a) detecting a direction of the driver's gaze oriented toward said obtained image display area, or b) detecting at least one obstacle corresponding to a danger level greater than a first predetermined danger threshold, the direction of gaze of the detected driver not being oriented toward said display area.

According to one particular feature, in the event of a level of danger calculated above the first danger threshold, the method comprises a display on said display area, superimposed on the display of images, of an indicator relating to the obstacle or obstacles detected.

The advantages of the visualization method for a motor vehicle are similar to the advantages of the display system recalled hereinbefore.

According to another aspect, the invention relates to a computer program comprising program code instructions which, when executed by a programmable electronic device, implement a visualization method for motor vehicle as briefly described hereinbefore.

BRIEF DESCRIPTION OF THE DRAWINGS

Other features and advantages of the invention will become apparent from the description given hereunder, by way of non-limiting indication, referring to the appended figures, among which.

DETAILED DESCRIPTION

Figure 1:
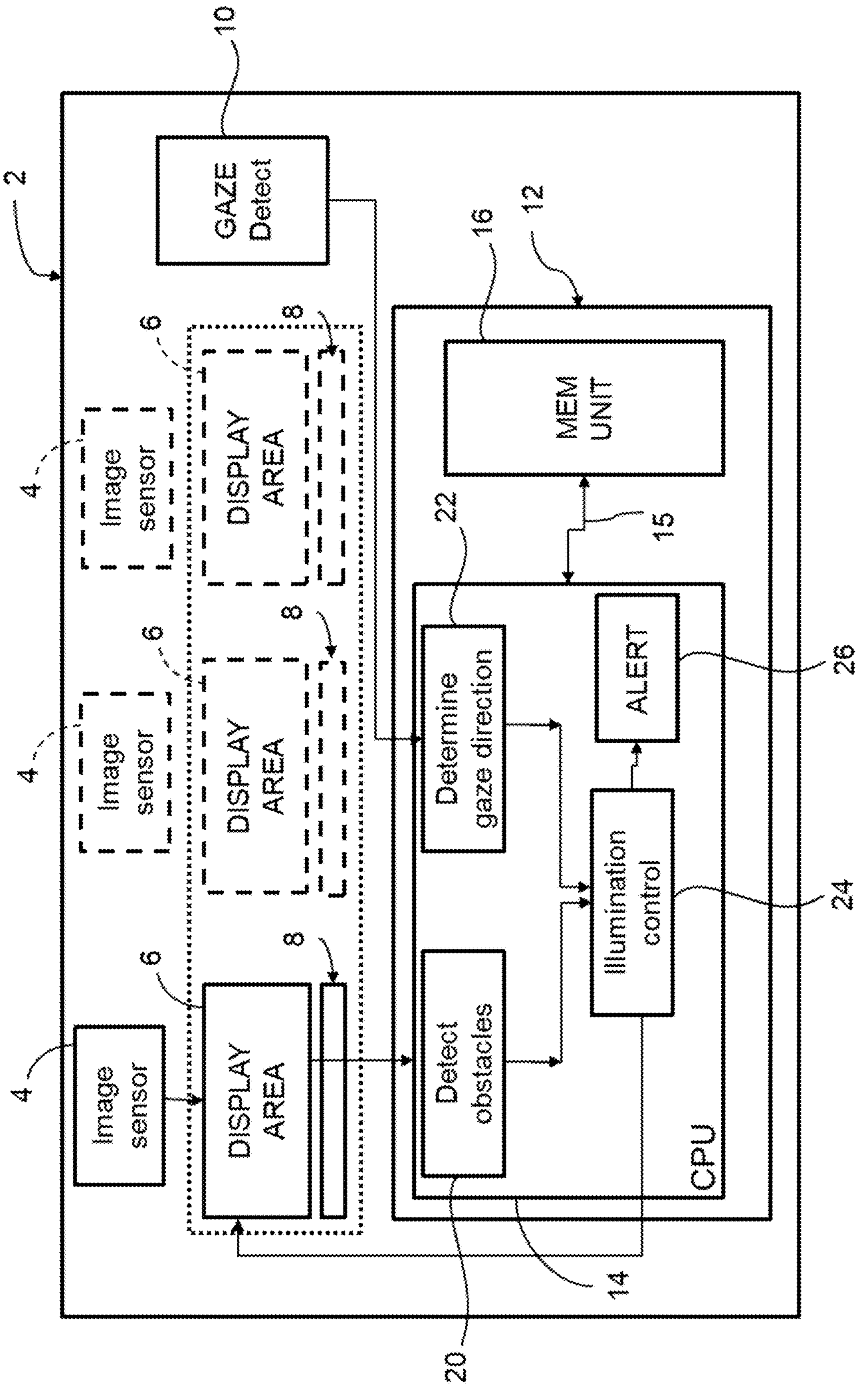
FIG. 1 schematically shows a visualization system for a motor vehicle according to one embodiment.

FIG. 1 schematically shows an image visualization system 2 of representative images of the outside of a motor vehicle (not shown).

The visualization system 2 comprises a plurality of sensors 4, for example cameras, configured for capturing images at a given frequency, for example positioned at various locations, oriented towards the outside of the vehicle so as to capture images of the external environment of the vehicle.

For example, such sensors are on-board sensors positioned externally, to the right, left, and rear of the vehicle, making it possible to obtain views from the exterior of the vehicle similar to the views of conventional rear-view mirrors.

The images thus captured, in the form of digital images, are displayed at a given display frequency on display areas 6 of associated display surfaces, configured to display the captured successive images. The or each display surface is illuminated by at least one associated illumination unit 8 dedicated to the illumination of the display surface.

In particular, the selective illumination by display areas of the display surface is provided.

According to one variant or in addition, sensors configured to provide image sequences from the outside of the vehicle are image sensors external to the vehicle, for example cameras positioned on the road or on other vehicles, and the image sequences are obtained by means of a wireless communication link between a wireless communication interface of the vehicle in question, and a remote communication system configured to provide sequences of images captured by the sensors external to the vehicle.

A display area 6 of a display surface, configured to display images obtained by sensors 4, forms an electronic mirror (emirror).

The extended display surface is for example a surface of liquid crystal display (LCD) screens, or a surface integrated into a trim element of the vehicle, and back-lit by controllable illumination units, for example light-emitting diode (LED) arrays.

A display area is a portion of a display surface, the illumination of which is controllable In some embodiments, the display area occupies the entire display surface.

The control of the illumination units 8 in particular makes it possible to control a brightness level, varying for example between 0 and 100% of a maximum brightness level, the consumption of electrical energy being correlated to this brightness level. In other words, the higher the brightness level, the higher the electrical energy consumption of the corresponding illumination units. Thus, the control of the illumination at a given brightness level makes it possible to control the consumption of electrical energy Subsequently, the description is dedicated to a display area 6 associated with an image sensor 4, illuminated by controllable illumination units, it being understood that the method described, in its various alternatives, applies similarly for each display area in the presence of multiple display areas.

Alternatively, a display surface can be configured to display images coming from several sources, that is to say, several sensors.

The system 2 further comprises a module 10 for detecting a direction of the gaze of the vehicle's driver, integrating for example an image sensor judiciously positioned in the passenger compartment of the vehicle and a calculations processor making it possible to detect the direction of the gaze of the driver, for example by a 3D vector in a given spatial reference frame. Such modules for detecting the direction of the driver's gaze are known, for example, in the field of driver monitoring systems or DMS.

The case is considered of a vehicle driven by a driver in the passenger compartment and who actuates the vehicle controls Of course, other people can be present in the vehicle; these are passengers.

The system 2 further comprises a programmable electronic device 12, for example an on-board computer, comprising a computing processor 14 and an electronic memory unit 16, connected by a communication bus 15.

The programmable electronic device 12 May comprise other elements, in particular communication interfaces with the on-board equipment, which are not shown here.

The processor 14 of the programmable electronic device 12 is configured to implement a module 20 for detecting obstacles in the images obtained by a sensor 4, configured to detect a presence of obstacles by applied image processing and to calculate an associated danger level.

Here, the term obstacle generally refers to a fixed or moving object detected in the processed images, and capable of being located in the trajectory of the vehicle. The danger level indicates a risk of any collision, with an associated time indication.

Thus, the term "obstacle" for example refers to fixed obstacles, such as road elements, e.g., safety railings, parked vehicles, or moving obstacles, for example other vehicles, bicycles or pedestrians. The list given here is of course not exhaustive. It will be understood that it is critical to avoid any collision between a moving vehicle and such obstacles.

The danger level is calculated as a function of the speeds and estimated trajectories of the detected moving obstacles, as well as the vehicle in question.

All methods known to a person skilled in the art of obstacle detection by processing successive images and calculating an associated danger level are applicable here.

In one embodiment, the danger levels are for example quantified on a scale ranging from 0 to 4 in the following manner:

Danger level 0: no obstacle detected,

Danger level 1: "moderate": potential obstacle at a time horizon greater than or equal to a time threshold Ts, for example Ts=5 seconds;

Danger level 2: "moderate": potential obstacle at a time horizon less than the time threshold Ts, but greater than an imminent time threshold Tsi, for example Tsi=2 seconds;

Danger level 3: "high danger": potential obstacle at a time horizon less than the imminent time threshold Tsi.

Furthermore, the processor 14 of the programmable electronic device 12 is configured to execute a module 22 for determining the direction of gaze relative to a given display area 6, the module 22 cooperating with the module 10 for detecting a direction of gaze of the driver of the vehicle.

Indeed, depending on the spatial position and dimensions of a given display area and the direction of the gaze of the driver, the module 22 is configured to determine whether or not the face of the driver is oriented toward the display area in question.

The modules 20, 22 are carried out continuously in a background task.

The processor 14 is further configured to execute a module 24 for controlling the brightness level of the display units associated with the display area in question.

The module 24 is configured to control illumination of the display surface at a basic brightness level, and to increase, for the display area in question, the brightness level at an enhanced brightness level when one of the following two conditions is valid:

the module for detecting a direction of the gaze of the driver detects a direction oriented toward the display area in question, or the obstacle detection module detects an obstacle corresponding to a danger level greater than a first predetermined danger threshold, and the direction of the driver's gaze is not oriented toward the display area in question.

For example, the first danger threshold is equal to 1, therefore condition b) is implemented as soon as a danger is detected.

In one embodiment, the base brightness level is for example between 0% and 30% of the maximum brightness.

In one embodiment, the level of enhanced brightness is for example between 60% and 100% of the maximum brightness, preferably between 60% and 80 M % of the maximum brightness.

In one embodiment, several levels of enhanced brightness are defined, in increments, as a function of the danger level.

The module 24 is further configured, when the danger level passes below the first predetermined danger threshold and the direction of the driver's gaze is no longer oriented toward the display area in question, to gradually decrease the brightness level between the enhanced brightness level and the base brightness level. Advantageously, the gradual decrease is preferable so as not to disturb the driver.

Additionally, the processor is configured to implement a module 26 for generating an alert by actuating one or more warning devices capable of emitting stimuli configured to alert the driver: for example sound emission, vibration of the seat, etc. The module 26 is implemented in addition to the module 24 for controlling the brightness level of the illumination units associated with the display area in question, in the event of detecting a danger of a level greater than or equal to a second danger threshold, referred to as high danger threshold, for example equal to 2, if the direction of gaze of the driver is not oriented toward the display area. Advantageously, this makes it possible to reinforce safety.

In one embodiment, the modules 20, 22, 24, 26 are made in the form of software instructions forming a computer program, which, when executed by a computer, implements a visualization method for motor vehicle according to the invention.

The computer program comprising software instructions is furthermore able to be recorded on a non-transitory computer-readable medium. The computer-readable medium is for example a medium able to store the electronic instructions and to be coupled to a bus of a computer system. As an example, the readable medium is an optical disc, a magneto-optical disc, a ROM memory, a RAM memory, any type of non-volatile memory (for example EPROM, EEPROM, FLASH, NVRAM), a magnetic card or an optical card.

In a variant not shown, the modules 20, 22, 24, 26 are each made in the form of programmable logic components, such as FPGAs (Field-Programmable Gate Arrays), microprocessors, GPGPU (General-Purpose Processing on Graphics Processing) components, or dedicated integrated circuits, such as ASICs (Application-Specific Integrated Circuits).

Figure 2:
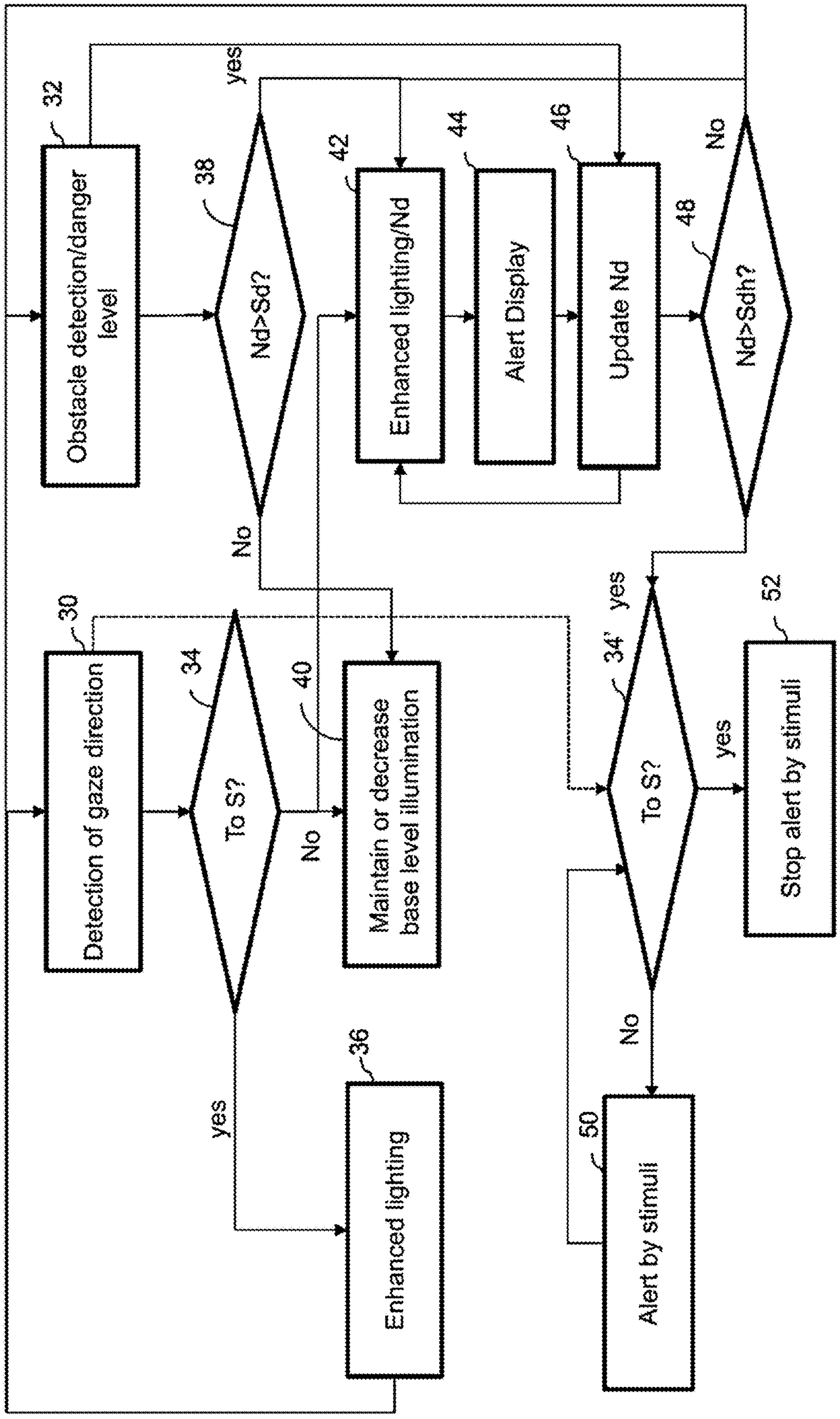
FIG. 2 is a block diagram of the main steps of a visualization method according to one embodiment.

FIG. 2 is a block diagram of the main steps of a visualization method for a motor vehicle, implemented in a visualization system 2 on board a motor vehicle as described with reference to FIG. 1.

The method is described here in its application for visualizing images from the outside of the vehicle, obtained by one or more sensors 4 configured to capture images from the outside of the vehicle that are displayed on an area of an associated display surface, which is referred to below as the display area in question, referenced S.

For example, as explained above, the image sensor is for example a right or left side sensor, making it possible to visualize outside side areas of the vehicle.

As a variant, the images are obtained by wireless communication means, according to an implemented wireless communication protocol.

For example, the display surface in question, and in particular the display area, is illuminated with a basic brightness level upon initialization, for example upon starting the vehicle and upon powering up the visualization system.

The method comprises steps 30 of detecting the direction of the driver's gaze and 32 for detecting one or more potential obstacle(s) and calculating an associated danger level Nd. These detection steps 30, 32 are carried out in a background task, at a given frequency.

The step 30 of detecting the direction of gaze is followed by a test 34 to determine whether the direction of the driver's gaze is oriented toward the display area S.

For example, it is determined whether a 3D vector characterizing the direction of the driver's gaze points toward a point of the display area S.

In the event of a positive response to test 34, a first condition (condition a) above) of increasing the brightness level to an enhanced brightness level is validated.

Step 34 is followed by a step 36 of increasing the brightness level. For example, the enhanced brightness level is comprised between 60% and 80% of the maximum brightness, for example 70% of the maximum brightness.

Preferably, the increase in the brightness is virtually immediate, and occurs during an interval of first duration between 1 millisecond and 20 milliseconds, preferably between 1 millisecond and 5 milliseconds.

If, however, the brightness level of the display area S in question was already an enhanced brightness level (for example, when the driver has looked at the display area S at a preceding time instant), step 40 consists in controlling a maintenance of the enhanced brightness level.

Substantially in parallel with the implementation of the test 34, the step 32 of detecting an obstacle(s) and a danger level calculation is systematically followed by a comparison 38 of the danger level Nd to a first predetermined danger threshold Sd.

For example, considering the graduated scale of danger levels between 0 and 3 described above, as soon as the danger level Nd is strictly greater than 0, the response to the comparison step is "yes". In other words, the first danger threshold is equal to 1.

When the danger level has not reached the first danger threshold Sd (response "no" to the comparison 38), and the gaze of the driver is not oriented toward the surface S, the brightness level is maintained at the base level (step 40).

If, however, the brightness level of the display area S in question was an enhanced brightness level (e.g., when the driver is looking towards the display area S at a preceding time instant), step 40 consists in controlling a gradual decrease in the illumination for a gradual passage of the enhanced brightness level toward the basic brightness level.

For example, the gradual decrease is carried out during a time interval of a second duration greater than the first duration and between 1 second and 5 seconds, for example of the order of 1.5 seconds.

If the response to test 34 is negative, that is to say, the driver does not look in the direction of the display area S, but the danger level has reached or exceeded the first danger threshold Sd, then a second condition (condition b) for increasing the brightness level is validated.

Steps 34, 38 are then followed by a step 42 of increasing the brightness level by controlling the illumination units of the display area S, to switch from the basic brightness level to an enhanced brightness level, with the objective of drawing the attention of the driver, and in particular of drawing the driver's gaze towards this surface.

In one embodiment, following the detection of a danger, regardless of the danger level, the enhanced brightness level is the maximum brightness level.

In one embodiment, several levels of enhanced brightness are selectable, depending on the level of danger calculated, the brightness level increasing with the calculated danger level.

Preferably, the increase in the brightness level between the basic brightness level and an enhanced brightness level is virtually immediate, the duration of the increase in the brightness level preferably being less than the duration of the gradual decrease in the brightness level. For example, the duration of the increase is between 1 millisecond and 20 milliseconds, preferably between 1 millisecond and 5 milliseconds.

In addition to the display of the images obtained for display in the display area S, preferably, the method also comprises a display 44 of a visual indication related to the obstacle detected, for example an obstacle framed preferably by a colored or flashing frame.

The method also comprises a step 46 of updating the calculated danger level.

Indeed, the calculated danger level can evolve, depending on possible changes in trajectory and speed of the movables involved (obstacle(s), vehicle).

Of course, the updating of the danger level is carried out following the iteration of the risk level calculation step 32 previously described.

During a subsequent step 48, it is determined whether the updated danger level Nd is greater than or equal to a second danger threshold or high danger threshold Sdh, which is greater than the first danger threshold.

For example, the high danger threshold is equal to 2.

If the danger level remains below the second danger threshold Sdh, the enhanced illumination (step 42) is maintained.

If the danger level is greater than or equal to the second danger threshold Sdh and the gaze of the driver is not oriented toward the display area S (step 34' analogous to step 34), the method comprises an issue of an alert 50 by activating one or more stimuli by vehicle devices, for example sound alert, for example chosen as a function of the danger level.

If, however, the driver's gaze is turned towards the display area S, which displays in particular the image and the obstacle (S) detected, the activation of the alert devices is stopped (step 52).

The steps of the method are repeated, so that the monitoring of the direction of the gaze of the driver and the calculation of the danger level are applied virtually continuously, as well as the light level controls as a function of the validation of the conditions a) and b).

Advantageously, energy saving is carried out because the area considered of the display surface is illuminated to a level of illumination conditionally enhanced, which implies that over long time periods of driving in a particular danger situation, the illumination is maintained with a basic brightness level, therefore with low electrical energy consumption.

Advantageously, the enhanced brightness level is chosen according to the calculated danger level.

Advantageously, the illumination with an enhanced brightness level makes it possible to attract the attention of the driver in the event of detection of a danger level greater than the predetermined danger threshold, which makes it possible to reinforce safety.

The invention claimed is:

1. A visualization method for a motor vehicle operated by a driver present in the motor vehicle, to visualize images obtained by at least one image sensor configured to capture images from the outside of the vehicle and displayed on an area of a display surface, said display surface being illuminated by at least one associated illumination unit, implemented by an on-board programmable electronic device, configured to continuously receive a direction of gaze of the vehicle driver, to detect a presence of obstacles by image processing and to calculate an associated danger level, the method comprising:

controlling a basic illumination on said display surface with a basic brightness level, and controlling an increase in the brightness level on said obtained image display area, from the basic brightness level to at least one enhanced brightness level, when either one of the following two conditions is validated:

condition a) detecting a direction of the driver's gaze oriented toward said obtained image display area, and condition b) detecting at least one obstacle corresponding to a danger level greater than a first predetermined danger threshold, the direction of gaze of the detected driver not being oriented toward said display area;

wherein the basic brightness level is comprised between 0% and 30% of a maximum brightness level and each enhanced brightness level of the at least one enhanced brightness level is between 60% and 100% of the maximum brightness level.

2. The method according to claim 1, comprising, in case of a level of danger calculated above the first danger threshold, a display on said display area, superimposed on the display of images, of an indication relating to the obstacle or to the obstacles detected.

3. A visualization system for a motor vehicle operated by a driver present in the motor vehicle, comprising:

a display surface comprising a display area of images obtained by at least one image sensor configured to capture images from the outside of the vehicle, said display surface being illuminated by at least one associated illumination unit, a module for detecting obstacle(s) in said obtained images, configured to detect a presence of obstacle(s) by image processing and to calculate an associated danger level, a module for detecting a direction of the gaze of the driver of the motor vehicle, and an electronic device comprising a computing processor, wherein said computing processor implements a control module of said at least one illumination unit configured for:

controlling a basic illumination on said display surface with a basic brightness level; and controlling an increase in the brightness level in said obtained image display area, from the basic brightness level to at least one enhanced brightness level, when either one of the following two conditions is validated:

condition a) the module for detecting the direction of the gaze of the driver detects a direction oriented toward said obtained image display area, condition b) the obstacle detection module(s) detects at least one obstacle corresponding to a calculated danger level that exceeds a first predetermined danger threshold, and the direction of gaze of the detected driver is not oriented toward said display area, wherein the basic brightness level is comprised between 0% and 30% of a maximum brightness level and each enhanced brightness level of the at least one enhanced brightness level is between 60% and 100% of the maximum brightness level.

4. The system of claim 3, wherein increasing the basic brightness level is carried out in a first duration interval between one millisecond and twenty milliseconds.

5. The system according to claim 3, wherein the control module is further configured, when the danger level passes below said first predetermined danger threshold and the direction of gaze detected by the detection module of a direction of the driver's gaze is not oriented toward said obtained image display area, to gradually decrease the brightness level toward the basic brightness level, during a time interval of second duration.

6. The system of claim 5, wherein the second duration is between 1 second and 5 seconds.

7. The system according to claim 3, configured for implementing a module for generating an alert when the detected danger level is greater than a second predetermined danger threshold, above the first predetermined danger threshold and the direction of gaze detected by the module for detecting a direction of the driver's gaze is not oriented toward said obtained image display area.

8. The system according to claim 7, wherein the alert generating module controls an emission of stimuli configured to alert the driver, as a function of the calculated danger level.

9. The system according to claim 3, wherein, in the case where the condition b) is validated, the control module is configured to control a level of enhanced brightness selected according to the calculated danger level, the brightness level increasing with the calculated danger level.

10. The system of claim 9, wherein at least two distinct danger levels are defined, and at least two corresponding enhanced brightness levels.

11. The system according to claim 3, wherein, in the case where the condition b) is validated, the control module is configured to control a maximum brightness level of illumination.

* * * * *